(12) United States Patent
Takeuchi

(10) Patent No.: US 10,648,408 B2
(45) Date of Patent: May 12, 2020

(54) AIRCRAFT FIRE SEAL STRUCTURE AND AIRCRAFT

(71) Applicant: MITSUBISHI AIRCRAFT CORPORATION, Aichi (JP)

(72) Inventor: Akira Takeuchi, Aichi (JP)

(73) Assignee: Mitsubishi Aircraft Corporation, Aichi (JP)

( * ) Notice: Subject to any disclaimer, the term of this patent is extended or adjusted under 35 U.S.C. 154(b) by 402 days.

(21) Appl. No.: 15/831,503

(22) Filed: Dec. 5, 2017

(65) Prior Publication Data
US 2018/0163631 A1    Jun. 14, 2018

(30) Foreign Application Priority Data
Dec. 5, 2016    (JP) .................. 2016-235821

(51) Int. Cl.
*F02C 7/25* (2006.01)
*B64D 27/26* (2006.01)
(Continued)

(52) U.S. Cl.
CPC .............. *F02C 7/25* (2013.01); *B64C 7/00* (2013.01); *B64D 27/26* (2013.01); *B64D 29/00* (2013.01); *B64D 29/06* (2013.01); *B64D 45/00* (2013.01); *B64D 33/02* (2013.01); *B64D 2027/262* (2013.01); *B64D 2045/009* (2013.01); *F05D 2220/323* (2013.01); *F05D 2240/14* (2013.01); *F05D 2240/59* (2013.01)

(58) Field of Classification Search
CPC .. F02C 7/25; B64C 7/00; B64D 27/26; B64D 29/00; B64D 29/06; B64D 45/00; B64D 33/02; B64D 2027/262; B64D 2045/009; F05D 2220/323; F05D 2240/14; F05D 2240/59; Y02T 50/671; E04B 1/948
See application file for complete search history.

(56) References Cited

U.S. PATENT DOCUMENTS

2015/0048202 A1    2/2015  Takeuchi
2016/0061328 A1*   3/2016  Ritoper .................. F16J 15/104
                                                                277/645
(Continued)

FOREIGN PATENT DOCUMENTS

GB    2415471 A  * 12/2005  ............... F02C 7/25
JP    2014-141202 A    8/2014

*Primary Examiner* — Rodney A Bonnette
(74) *Attorney, Agent, or Firm* — Osha Liang LLP

(57) ABSTRACT

A fire seal structure prevents flame from coming out of a fire-prevention region of an aircraft. The fire seal structure includes: a plurality of walls including: a first wall provided on a first partitioning member; and a second wall provided on a second partitioning member. One of the plurality of walls is a spring wall that functions as a spring. The first and the second partitioning members define the fire-prevention region. The plurality of walls forms a labyrinth-shaped gap between the first and the second partitioning members. Each of the plurality of walls contains a refractory material and includes a front end part. When the first and the second partitioning members are stationary with respect to each other, the front end part is not in contact with another member, and the spring wall is disposed closest to a facing member, among the plurality of walls.

8 Claims, 10 Drawing Sheets

(51) Int. Cl.
*B64D 29/00* (2006.01)
*B64D 45/00* (2006.01)
*B64D 29/06* (2006.01)
*B64C 7/00* (2006.01)
*B64D 33/02* (2006.01)

(56) References Cited

U.S. PATENT DOCUMENTS

2018/0156130 A1* 6/2018 Takeuchi .................. B64C 7/00
2018/0156334 A1* 6/2018 Takeuchi ................ F16J 15/065
2018/0298772 A1* 10/2018 Ratajac ................. F01D 11/003
2018/0347576 A1* 12/2018 Juh ......................... F04D 29/10

* cited by examiner

AIRCRAFT FIRE SEAL STRUCTURE AND AIRCRAFT

BACKGROUND OF THE INVENTION

Field of the Invention

The present invention relates to a fire seal structure that prevents flame from coming out of a fire-prevention region of an aircraft.

Description of the Related Art

A fire-prevention region is designated around an ignition source from which flame may occur, such as an engine main body and an auxiliary power unit of an aircraft, and it is required to prevent the flame occurring inside the fire-prevention region from coming out of the fire-prevention region.

For example, the fire-prevention region that confines the flame occurring from the engine main body (engine core) is designated inside an engine nacelle.

When fire occurs from the engine main body, it is necessary to prevent the flame from coming through a gap between the engine nacelle and a pylon to blow off to outside. Accordingly, the gap between the engine nacelle and the pylon is sealed by an elastic seal (JP 2014-141202 A).

The engine nacelle and the pylon that supports the engine nacelle to a main wing are relatively largely moved when receiving external force such as a load in landing and an aerodynamic load and vibration in flight. Accordingly, as a fire seal provided at a connection portion between the engine nacelle and the pylon, a rubber seal that secures a large elastic deformation amount and maintains a sealing state even if relative displacement is large, is typically adopted.

The rubber seal containing silicone rubber or the like, however, is inferior in fire resistance to a metal material such as stainless steel. Therefore, the fire seal performance of the rubber seal to prevent passage of flame has a room for improvement. If a member that shields the rubber seal from flame is necessary in order to delay a time until the fire seal performance is lost due to deterioration of elastic force of the rubber seal through exposure to flame and burning down of the rubber seal, the weight of the fire seal structure is increased.

When the elastic seal containing the metal material is used, the elastic seal is saved from being burned down for a predetermined time; however, it is difficult to obtain the large elastic deformation amount by the metal elastic seal having elastic modulus larger than elastic modulus of the rubber material. Accordingly, the metal elastic seal is unsuitable for fire seal between members that are relatively largely displaced. In addition, the metal elastic seal does not follow a surface to an extent equivalent to the rubber elastic seal, and the metal elastic seal is accordingly inferior to the rubber seal in adhesion with the surface.

Further, the elastic seals of all types have a short life time because of abrasion due to friction with a contact member.

SUMMARY OF THE INVENTION

One or more embodiments of the present invention provide a fire seal structure for an aircraft that is applicable between members that are relatively largely displaced, and makes it possible to improve fire seal performance without necessity of adding a flame-shielding member and to reduce burden of maintenance, and to provide an aircraft.

A fire seal structure for an aircraft according to one or more embodiments of the present invention prevents flame from coming out of a fire-prevention region of the aircraft.

The fire seal structure includes a plurality of walls including a wall provided on a first partitioning member and a wall provided on a second partitioning member. The first partitioning member and the second partitioning member define the fire-prevention region.

The plurality of walls form a labyrinth-like gap between the first partitioning member and the second partitioning member.

Each of the plurality of walls contains a refractory material and has a front end part that is not in contact with another member in a stationary state where the first partitioning member and the second partitioning member are not relatively moved.

A part of the plurality of walls is a spring wall functioning as a spring and is closest to a facing member in the stationary state, among the plurality of walls.

In the above-described fire seal structure according to one or more embodiments, the spring wall comes into contact with the facing member and is elastically deformed and the other walls do not come into contact with the facing member when the first partitioning member and the second partitioning member are relatively moved in an approaching direction.

Further, a fire seal structure for an aircraft according to one or more embodiments of the present invention prevents flame from coming out of a fire-prevention region of the aircraft.

The fire seal structure includes a plurality of walls including a wall provided on a first partitioning member and a wall provided on a second partitioning member. The first partitioning member and the second partitioning member define the fire-prevention region.

The plurality of walls form a labyrinth-like gap between the first partitioning member and the second partitioning member.

Each of the plurality of walls is a spring wall that contains a refractory material and functions as a spring, and has a front end part that is not in contact with a facing member in a stationary state where the first partitioning member and the second partitioning member are not relatively moved.

The spring wall comes into contact with the facing member and is elastically deformed when the first partitioning member and the second partitioning member are relatively moved in an approaching direction.

In the fire seal structure of one or more embodiments of the present invention, the spring wall is a stacked body in which two or more comb tooth-shaped plate springs each including a plurality of slits are stacked, and the slits of one of the two or more plate springs are each covered by a corresponding portion between the slits of the other plate spring.

In the fire seal structure of one or more embodiments of the present invention, two or more of the plurality of walls are each configured as the spring wall.

In the fire seal structure for the aircraft of one or more embodiments of the present invention, the first partitioning member is a pylon supporting an engine of the aircraft, and the second partitioning member is a nacelle surrounding a main body of the engine.

In the fire seal structure for the aircraft of one or more embodiments of the present invention, the labyrinth-like gap is covered by a blocking member that is provided on one of the wall and the facing member.

An aircraft according to one or more embodiments of the present invention includes the above-described fire seal structure.

According to the fire seal structure of one or more embodiments of the present invention, the plurality of walls are disposed to form the labyrinth-like gap at a connection portion between the first partitioning member and the second partitioning member together defining the fire-prevention region. Therefore, even if flame enters the labyrinth-like (maze-like) gap from an inlet of the maze, spreading of the flame is inhibited by the walls based on a straight travel property of the flame.

A part or all of the plurality of walls forming the labyrinth-like gap come into contact with the corresponding facing member and are accordingly elastically deformed, thereby absorbing the displacement when relative displacement is large.

Each of the plurality of walls forming the labyrinth-like gap contains the refractory material such as a metal, excellent in durability to the flame as compared with a rubber material, and exists between the first partitioning member and the second partitioning member for the predetermined time under a situation where the plurality of walls are exposed to the flame. This makes it possible to prevent the flame inside the fire-prevention region from coming out of the fire-prevention region for the predetermined time without adding of a member that shields the plurality of walls from the flame.

The walls of the fire seal structure are not in contact with the corresponding facing member except when the spring wall is elastically deformed due to large relative displacement. Therefore, abrasion of the walls is small. Even if abrasion occurs, deterioration of the fire seal performance does not occur as long as a state where the walls are overlapped with one another is maintained, which results in a long life time.

As described above, the fire seal structure of one or more embodiments of the present invention is applicable between the members that are relatively largely displaced, and makes it possible to improve the fire seal performance without necessity of adding a flame-shielding member, and to reduce burden of maintenance.

DETAILED DESCRIPTION OF EMBODIMENTS

Embodiments of the present invention are described with reference to accompanying drawings.

Figure 1:
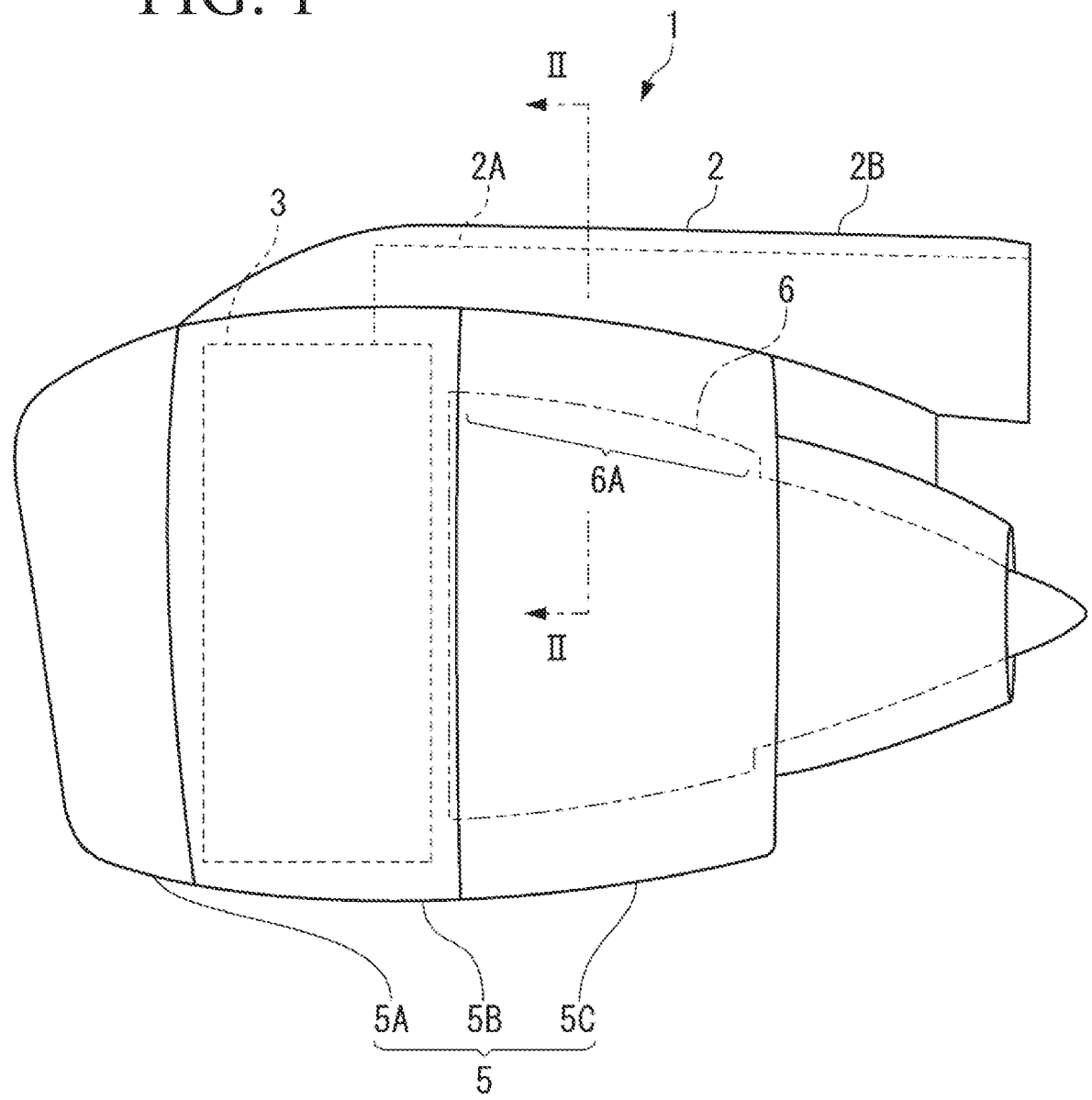
FIG. 1 is a diagram schematically illustrating an engine of an aircraft according to one or more embodiments of the present invention as viewed from side.
Figure 2:
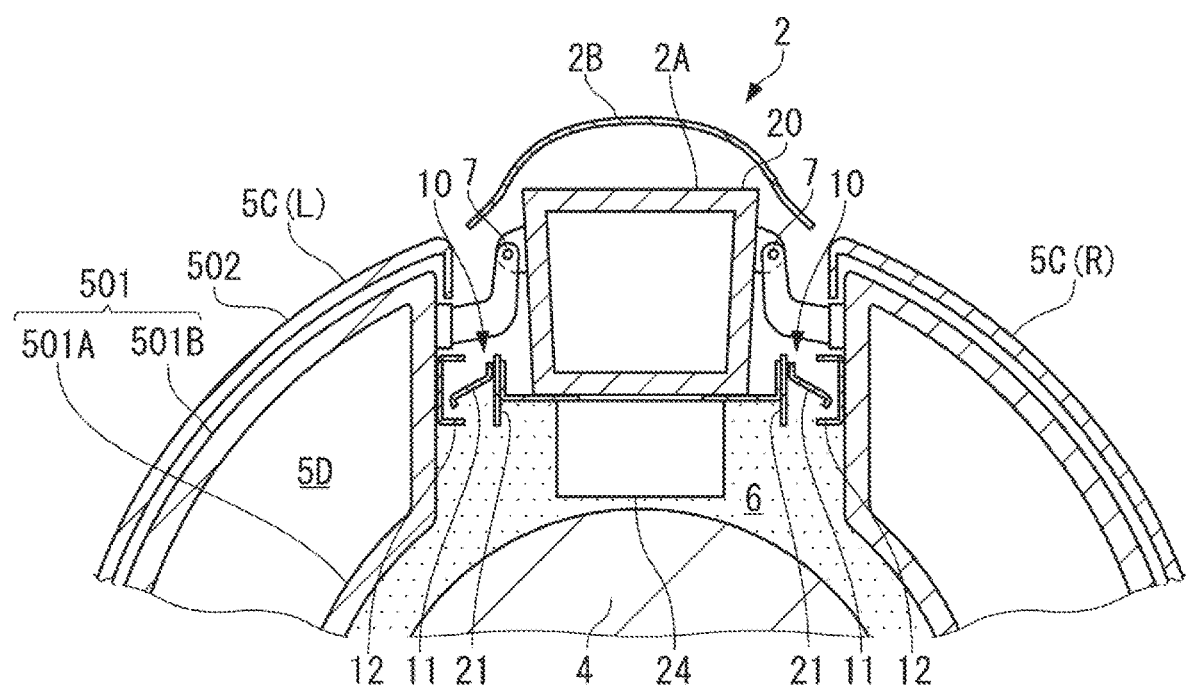
FIG. 2 is a cross-sectional view taken along a line II-II in FIG. 1.

An engine 1 of an aircraft illustrated in FIG. 1 and FIG. 2 is supported to an unillustrated main wing by a pylon 2.

For example, in a case of a turbo fan engine, the engine 1 according to one or more embodiments includes a fan 3 (FIG. 1), an engine core (compressor and combustion chamber) 4 (FIG. 2) that is a main body of the engine 1, and a cylindrical engine nacelle 5 that surrounds the fan 3 and the engine core 4.

The pylon 2 includes a pylon main body 2A as a structure member, and a pylon fairing 2B that covers the pylon main body 2A. FIG. 1 illustrates only a front part of the pylon 2, and illustration of a rear part is omitted.

As illustrated in FIG. 1, the engine nacelle 5 includes an air inlet 5A that takes air into the fan 3, a fan cowl 5B that continues to a rear end of the air inlet 5A, and a thrust reverser cowl 5C that continues to a rear end of the fan cowl 5B.

The fan 3 is surrounded by the fan cowl 5B, and the engine core 4 is surrounded by the thrust reverser cowl 5C.

Air flow blown off rearward from the fan 3 is distributed into a flow path 5D (FIG. 2) and an inside of the engine core 4. The flow path 5D is provided inside the thrust reverser cowl 5C.

The thrust reverser cowl 5C discharges the air flow to outside, thereby functioning as a thrust reverser.

The thrust reverser cowl 5C includes a cowl portion 501 and a reverse thrust operation portion 502. The cowl portion 501 forms a fire-prevention region 6 between the cowl portion 501 and an outer periphery of the engine core 4. The reverse thrust operation portion 502 is at least partially movable and includes a reverse injection function of discharging, to the outside, the air flow flowing inside the cowl portion 501. The reverse thrust operation portion 502 includes a mechanism that is slid in a front-rear direction during reverse injection, or a door that is opened during the reverse injection.

The fire-prevention region 6 is provided for a case where fire occurs from the engine core 4. As illustrated by a dot pattern in FIG. 2, the fire-prevention region 6 is provided between both of the cowl portion 501 and the pylon 2 and the engine core 4. In one or more embodiments, outer peripheral side of the fire-prevention region 6 is defined by the pylon main body 2A (first partitioning member) and the cowl portion 501 (second partitioning member). An inner part 501A that is an inner peripheral part of the cowl portion 501 is configured with use of a refractory material.

The air that is ejected rearward from the fan 3 flows through the flow path 5D between the inner part 501A and an outer part 501B of the cowl portion 501. A space between the inner part 501A and the outer part 501B is a cavity except for an upper part that is a space where devices such as an accessory 24 are disposed and a lower part that is a space where a coupling structure of right and left cowls, piping, etc. are disposed. A cross-sectional area of the flow path 5D is largely secured by the cavity.

The engine core 4 that is located on inner peripheral side of the fire-prevention region 6 is disposed on a box-shaped member 20 serving as a main structure member of the pylon main body 2A, and is mechanically coupled to the cowl portion 501 and the fan 3.

Note that the accessory 24 such as a heat exchanger is attached to lower side of the member 20.

The thrust reverser cowl 5C is divided into a right side member R and a left side member L. Upper end parts of the respective members R and L are pivotally supported by the member 20 of the pylon main body 2A. The members R and L pivot about a hinge part 7, thereby opening or closing the inside of the engine 1. When the members R and L are opened, the engine core 4 is exposed.

To prevent flame from coming out of the fire-prevention region 6 through a gap between a member 21 provided on the pylon main body 2A and the thrust reverser cowl 5C, a fire seal structure 10 is provided in the engine 1.

"Fire seal" indicates prevention of flame occurring inside the fire-prevention region 6 from coming out of the fire-prevention region 6.

The fire seal structure 10 is provided at a connection portion between the pylon main body 2A and the member R on right side of the pylon 2, and at a connection portion between the pylon main body 2A and the member L on left side of the pylon 2.

Figure 3:
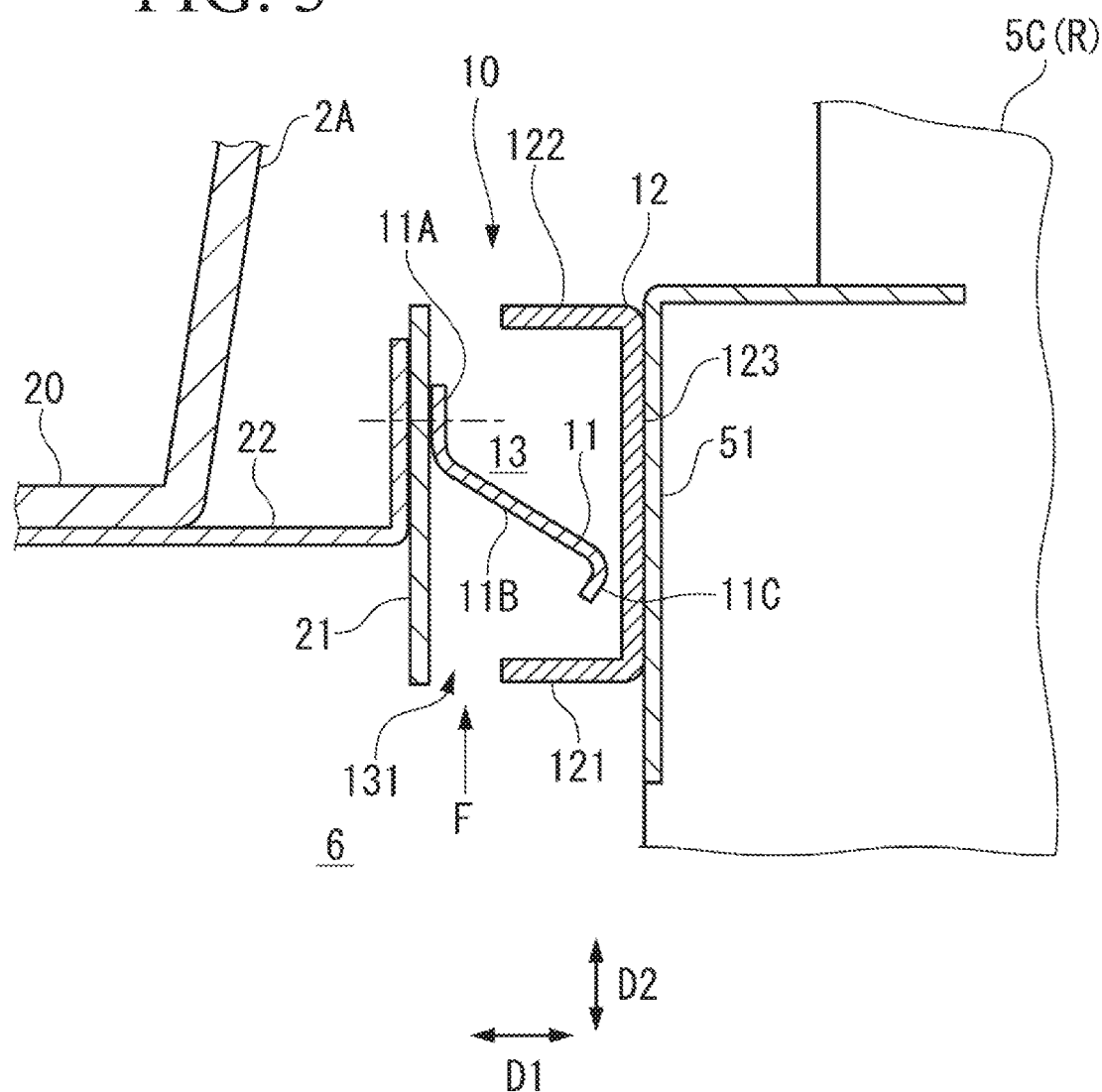
FIG. 3 is a cross-sectional view schematically illustrating, through enlargement of a part of FIG. 2, a fire seal structure that is located at a connection portion between an engine pylon and an engine nacelle.

As illustrated in FIG. 3, the fire seal structure 10 is interposed between the member 21 and a member 51. The member 21 (hereinafter, pylon member) is provided on the main member 20 of the pylon main body 2A with a member 22 in between. The member 51 (hereinafter, nacelle member) is provided on the thrust reverser cowl 5C.

The pylon member 21 and the nacelle member 51 both extend, at a boundary of the fire-prevention region 6 (FIG. 1), for example, in a direction orthogonal to a paper surface of FIG. 3 along a section 6A of the boundary.

As illustrated in FIG. 3, the pylon member 21 and the nacelle member 51 are disposed in parallel to each other with a predetermined distance therebetween in a width direction D1 (lateral direction) of the pylon 2 while standing along a vertical direction.

Note that the pylon member 21 and the nacelle member 51 may not be disposed in parallel to each other.

The fire seal structure 10 may be disposed rearward of the section 6A at the boundary of the fire-prevention region 6. In addition, the fire seal structure 10 may be disposed so as to extend along the front-rear direction at a coupling portion of the right and left thrust reverser cowls 5C (R and L). Further, the fire seal structure 10 may be disposed along a circumferential direction at a front end part of the cowl portion 501.

The fire seal structure 10 prevents the flame inside the fire-prevention region 6 from coming through a gap between the pylon member 21 and the nacelle member 51 upward (in direction D2) to blow off to the outside of the fire-prevention region 6 for at least a predetermined fire resistance time.

The fire seal structure 10 includes a spring wall 11 provided on the pylon member 21 and a channel member 12 provided on the nacelle member 51.

The spring wall 11 and the channel member 12 each contain a refractory material, and each extend in the direction orthogonal to the paper surface of FIG. 3, as with the pylon member 21 and the nacelle member 51. The spring wall 11 and the channel member 12 may each include a plurality of members that are coupled in the direction orthogonal to the paper surface without a gap, or each may be integrally formed.

In contrast to the configuration illustrated in FIG. 3, the channel member 12 may be provided on the pylon member 21 and the spring wall 11 may be provided on the nacelle member 51.

When the member R of the thrust reverser cowl 5C is opened, the channel member 12 follows movement of the member R. At this time, the channel member 12 is separated from the spring wall 11 that remains on the pylon main body 2A.

A labyrinth gap 13, as a labyrinth-like gap, configured by the spring wall 11 and paired flange walls 121 and 122 of the channel member 12 is provided between the pylon member 21 and the nacelle member 51. The spring wall 11 protrudes from the pylon member 21 toward the nacelle member 51. The paired flange walls 121 and 122 receive the spring wall 11 therebetween.

The channel member 12 is a channel-shaped member (having substantially C-shaped cross-section) including the paired flange walls 121 and 122 and a web 123 that couples the flange walls 121 and 122 to each other.

The flange walls 121 and 122 protrude from the web 123 fastened to the nacelle member 51, toward the pylon member 21, and front ends of the respective flange walls 121 and 122 face the pylon member 21.

Note that, in place of the channel member 12, two members each having an I-shaped cross-section or an L-shaped cross-section may be disposed on the nacelle member 51. Also in this case, two walls each protruding toward the pylon member 21 may be provided on the nacelle member 51, as with the flange walls 121 and 122.

The spring wall 11 and the flange walls 121 and 122 alternately protrude in a direction orthogonal to a direction in which flame F spreads along the direction D2 between the pylon member 21 and the nacelle member 51. The labyrinth gap 13 that meanders with respect to the spreading direction of the flame F is configured by the flange wall 121, the spring wall 11, and the flange wall 122.

Even if the flame F enters the meandering labyrinth (maze)-like gap 13 through an inlet of the labyrinth, namely, the gap between the front end of the flange wall 121 located on lower side (inner peripheral side) and the pylon member 21, spreading of the flame F is inhibited by the spring wall 11 and the flange wall 122 because the flame F spreads straightly and does not turn.

As described above, the spring wall 11 and the channel member 12 each contain the refractory material.

The "refractory material" indicates a material that has fire resistance sufficient to be saved from being excessively deformed, burned down, and lost even if the material is continuously exposed to flame for a predetermined fire resistance time required based on regulations, etc.

The spring wall 11 and the channel member 12 may be formed of, for example, the refractory material such as corrosion-resistant steel (stainless steel, CRES), an aluminum alloy, a titanium alloy, fiber-reinforced plastics containing glass fibers or carbon fibers as reinforcing fibers, an inorganic sintered body, a plasterboard, and a honeycomb sandwich panel, and materials matched to fire resistance test specified in the aviation act.

In addition, an appropriate material that has fire resistance and has rigidity necessary for strength securement may be used as the refractory material.

The channel member 12 may be formed of such a refractory material with a thickness sufficient to withstand flame for a necessary fire resistance time. The spring wall 11 may be formed of the refractory material in appropriate form with an appropriate thickness so as to withstand flame for the necessary fire resistance time and to function as a spring. As the refractory material used for the spring wall 11, spring steel that has sufficiently large elastic limit and sufficiently large fatigue limit is suitable.

The pylon main body 2A and the thrust reverser cowl 5C that is supported to the pylon main body 2A by the hinge part 7 are relatively largely moved when receiving external force such as a load in landing and an aerodynamic load and vibration in flight.

Even when the pylon main body 2A and the thrust reverser cowl 5C are relatively largely moved, it is necessary to avoid breakage due to interference between the members provided on the pylon main body 2A and the members provided on the thrust reverser cowl 5C.

Accordingly, the fire seal structure 10 is configured such that the spring wall 11, out of the plurality of walls 121, 11, and 122 configuring the labyrinth gap 13, functions as the spring. The front end of the spring wall 11 is closest to a corresponding facing member, out of all of the walls 121, 11, and 122, in a stationary state where the pylon main body 2A and the thrust reverser cowl 5C are not relatively moved.

When the pylon main body 2A and the thrust reverser cowl 5C are relatively largely moved in an approaching direction, the spring wall 11 comes into contact with the web 123 of the channel member 12 as the facing member and is accordingly elastically deformed, whereas the flange walls 121 and 122 as the other walls do not come into contact with the pylon member 21 as the facing member.

A configuration of the spring wall 11 is specifically described.

As illustrated in FIG. 3, the spring wall 11 includes a fastened part 11A, a middle part 11B, and a front end part 11C. The spring wall 11 configures a wall forming the labyrinth gap 13 and is a plate spring.

The fastened part 11A is disposed on an outer surface of the pylon member 21, and is fastened to the pylon member 21 and the member 22.

The middle part 11B extends from the fastened part 11A in a direction inclined to the pylon member 21.

The front end part 11C is continuous to the middle part 11B and faces the web 123 of the channel member 12. The front end part 11C includes a surface that is convexly curved toward the web 123.

When the pylon main body 2A and the thrust reverser cowl 5C are relatively largely moved in the approaching direction, the front end part 11C of the spring wall 11 comes into contact with the surface of the web 123, and the spring wall 11 is compressed and elastically deformed between the web 123 and the pylon member 21.

Figure 4:
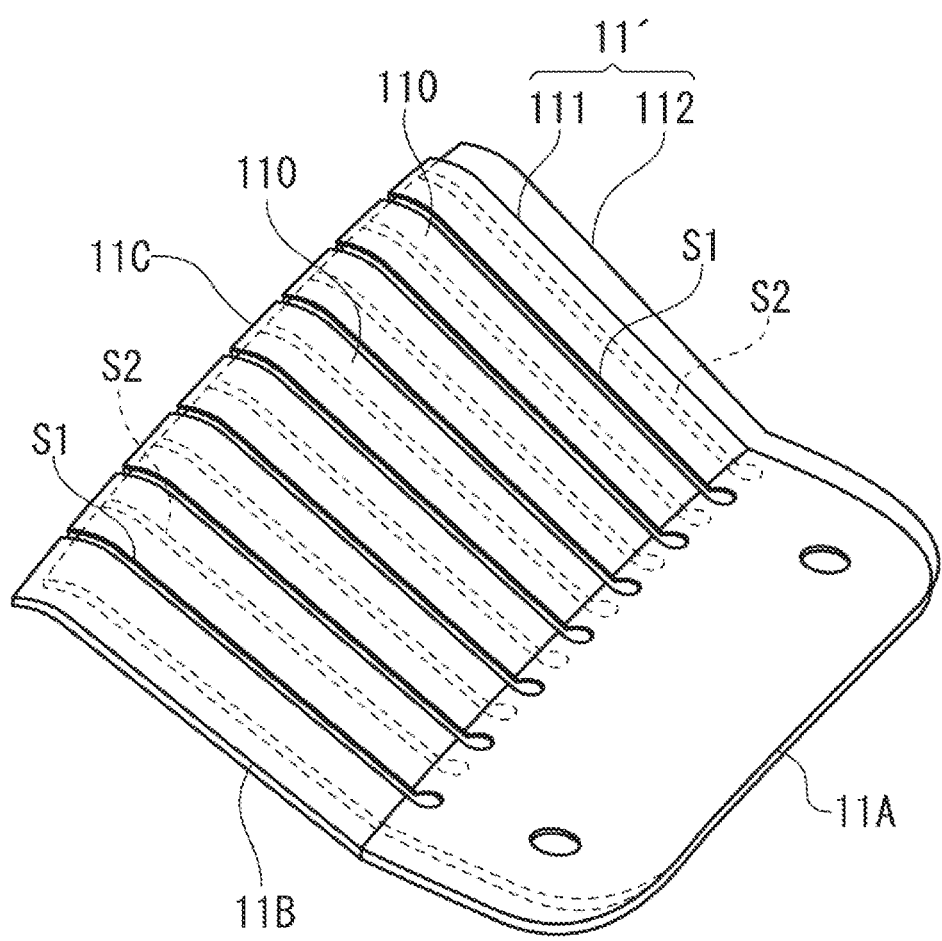
FIG. 4 is a perspective view illustrating an example of a spring wall that configures the fire seal structure illustrated in FIG. 3.

As the spring wall 11, a stacked body 11' of a plurality of plate springs 111 and 112 each including slits as illustrated in FIG. 4 may be adopted. The plate spring stacked body 11' is obtained by stacking the plurality of (in this case, two) comb tooth-shaped plate springs 111 and 112 each including the plurality of slits. Slits S1 and S2 are provided over the front end part 11C and the middle part 11B of the stacked body 11'.

The plate spring 111 and the plate spring 112 are stacked such that a position of each of slits S1 of the plate spring 111 and a position of each part between adjacent slits S2 of the plate spring 112 correspond to each other.

Accordingly, the slits S1 are covered by the plate spring 112 and the slits S2 are covered by the plate spring 111. As a result, the stacked body 11' configures the "wall" forming the labyrinth gap 13, as with the spring wall 11.

Note that a plurality of plate spring stacked bodies 11' may be coupled and disposed over the entire length of the installation region of the fire seal structure 10.

Thin parts 110 that are each located between the adjacent slits, of each of the plate springs 111 and 112 formed in a comb tooth-shape are elastically deformable individually by smaller force as compared with the plate spring with no slit. Therefore, each of the parts 110 is smoothly elastically deformed individually by a deformation amount corresponding to a size of the gap between the pylon member 21 and the nacelle member 51 when the front end part 11C of the plate spring stacked body 11' comes into contact with the surface of the web 123.

According to the above-described plate spring stacked body 11', the thin parts 110 are elastically deformable individually. Accordingly, it is possible to obtain a favorable following property to the surface of the web 123 with which the front end part 11C comes into contact even when the pylon main body 2A and the thrust reverser cowl 5C are relatively largely moved in a state where the relative displacement amounts of the respective thin parts separated in the extending direction of the fire seal structure 10 are different from one another. As a result, the plate spring stacked body 11' seals or substantially seals the passage of the flame between the pylon member 21 and the nacelle member 51, which results in high effect of blocking passage of the flame.

It is possible to secure the fire seal performance sufficient to prevent passage of the flame to the outside of the fire-prevention region 6 for the predetermined fire resistance time because the flange wall 121, the spring wall 11, and the flange wall 122 are disposed in the direction facing the flame spreading straightly between the pylon member 21 and the nacelle member 51. Therefore, it may be unnecessary that the spring wall 11 is in close contact with the surface of the web 123 when the spring wall 11 comes into contact with the web 123.

As the spring wall 11, a typical plate spring that is formed by bending a metal plate may be used without limitation to the above-described plate spring stacked body 11'.

A configuration and action necessary to prevent passage of the flame while avoiding interference between the members when the pylon main body 2A and the thrust reverser cowl 5C are relatively largely moved, are described below with reference to FIGS. 5A to 5C.

Figure 5A:
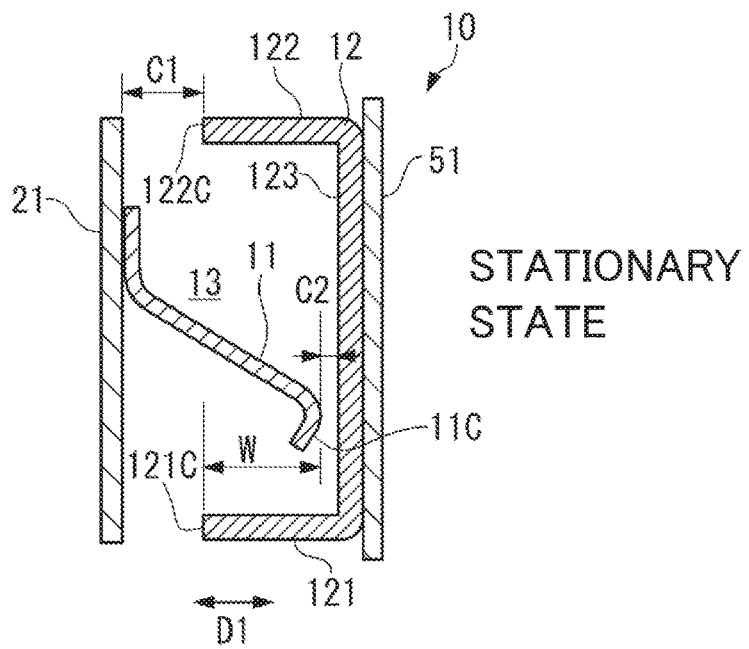
FIGS. 5A to 5C are diagrams each illustrating a state of the fire seal structure according to one or more embodiments, FIG. 5A illustrating a stationary state where the pylon and the nacelle are not relatively moved, FIG. 5B illustrating a state where the pylon and the nacelle are moved in a separating direction, and FIG. 5C illustrating a state where the pylon and the nacelle are moved in an approaching direction.

FIG. 5A illustrates a state of the fire seal structure 10 in the stationary state where the pylon 2 and the thrust reverser cowl 5C are not relatively moved. The stationary state indicates, for example, a parking state.

In the stationary state, a clearance C1 is present between front end parts 121C and 122C of the respective flange walls 121 and 122 and the surface of the pylon member 21, and a clearance C2 is present between the front end part 11C of the spring wall 11 and the surface of the web 123 of the channel member 12.

The front end parts of the respective walls 121, 11, and 122 forming the labyrinth gap 13 are not in contact with the corresponding facing members (non-contact state) because of the clearances C1 and C2.

The clearance C1 and the clearance C2 have relationship described below.

C1>C2

In other words, the front end part of the spring wall 11 is closest to the corresponding facing member, among all of the walls 121, 11, and 122.

In the stationary state as illustrated in FIG. 5A, the spring wall 11 and the flange wall 121 (or 122) are overlapped with each other by a dimension W in the width direction D1 of the pylon 2. The dimension W is secured larger than an estimated maximum displacement amount of the pylon member 21 and the nacelle member 51, for example, a displacement amount in landing.

Figure 5B:
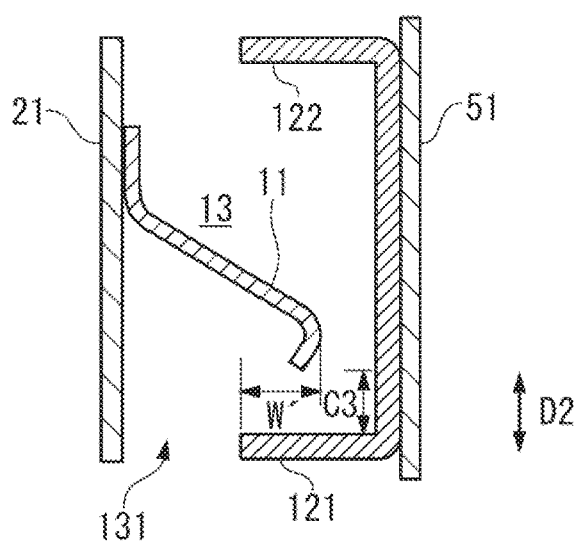

Accordingly, as illustrated in FIG. 5B, even when the pylon 2 and the thrust reverser cowl 5C are relatively moved in the width direction D1 by the estimated maximum displacement amount such that the pylon member 21 and the nacelle member 51 are separated from each other, the spring wall 11 and the flange wall 121 (or 122) are overlapped with each other by a dimension W'. At this time, the labyrinth-like gap 13 between the pylon member 21 and the nacelle member 51 is maintained by the flange wall 121, the spring wall 11, and the flange wall 122. Therefore, even if the flame enters an inlet 131 of the labyrinth gap 13, it is possible to inhibit spreading of the flame by the spring wall 11 and the flange wall 122 that are located ahead of the straightly spreading direction of the flame, as with the stationary state (FIG. 5A).

Note that, to prevent interference between the spring wall 11 and the flange walls 121 and 122 when the pylon member 21 and the nacelle member 51 are relatively displaced in a vertical direction (D2), for example, a clearance C3 in the vertical direction (D2) is set between the spring wall 11 and the flange wall 121 that is close to the spring wall 11.

Figure 5C:
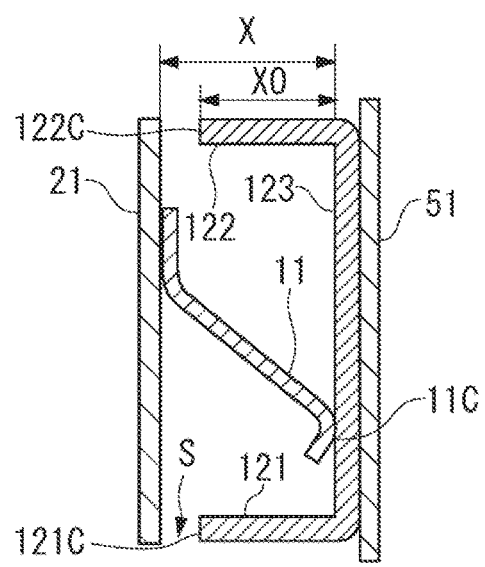

FIG. 5C illustrates a state of the fire seal structure 10 when the pylon 2 and the thrust reverser cowl 5C are relatively moved in the width direction D1 by the estimated maximum displacement amount such that the pylon member 21 and the nacelle member 51 are brought close to each other.

In this state, the pylon member 21 and the nacelle member 51 are relatively displaced by a displacement amount exceeding the clearance C2 (FIG. 5A). Therefore, the front end part 11C of the spring wall 11 is in contact with the web 123, and the spring wall 11 is compressed and elastically deformed between the pylon member 21 and the nacelle member 51.

Also in the state illustrated in FIG. 5C, the flange wall 121, the spring wall 11, and the flange wall 122 are overlapped with one another between the pylon member 21 and the nacelle member 51 so as to face the flame. This makes it possible to inhibit passage of the flame even if the flame enters a gap S.

Figure 10A:
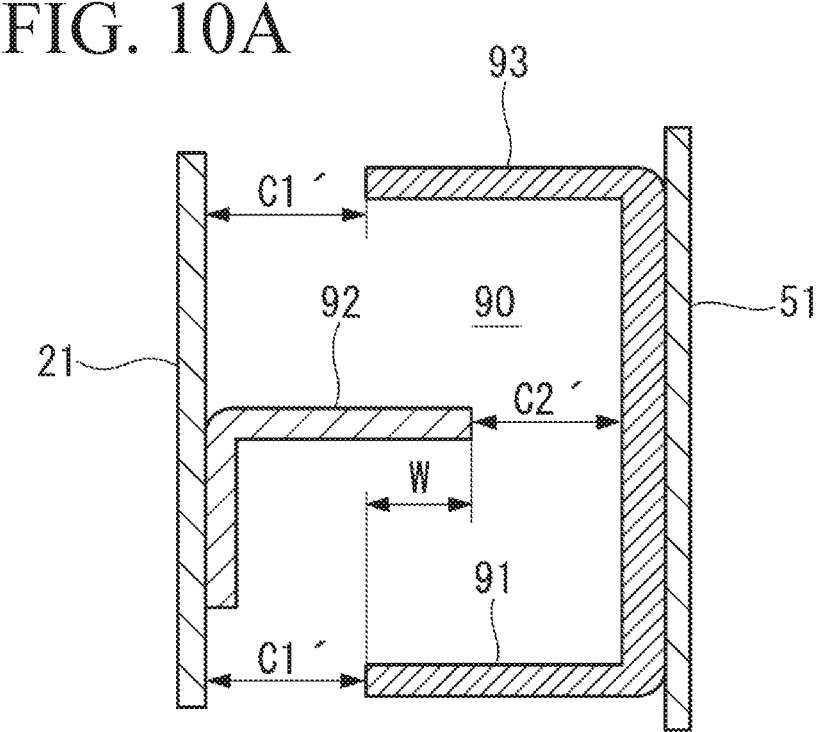
FIG. 10A is a cross-sectional view illustrating a fire seal structure of a reference example.

It is assumed that a labyrinth gap 90 is formed by three walls 91 to 93 not including a spring wall, to achieve fire seal as illustrated in FIG. 10A.

In this case, clearances C2' and C1' in the stationary state are set to prevent interference between the walls 91 to 93 and members respectively facing the walls 91 to 93 when relative displacement is large, and the dimension W of the overlapping is secured so as to maintain the overlapping state also when the pylon member 21 and the nacelle member 51 are displaced in the separating direction.

According to the configuration of FIG. 10A not including the spring wall, the clearances C1' and C2' that are larger than the clearances of the fire seal structure 10 are necessary because displacement absorption by the elastic deformation is not expected, which results in upsizing of the structure.

When a part of the plurality of walls 121, 11, and 122 forming the labyrinth gap 13 is the spring wall 11 that comes into contact with the corresponding facing member before other walls as with the fire seal structure 10 according to one or more embodiments, the relative displacement of the pylon member 21 and the nacelle member 51 is partially absorbed by the elastic deformation of the spring wall 11. This makes it possible to downsize the structure and to contribute to reduction of a weight of the aircraft.

According to one or more embodiments, to seal a gap between members that are relatively largely displaced, a rubber seal that secures a large elastic deformation amount is typically adopted.

Figure 10B:
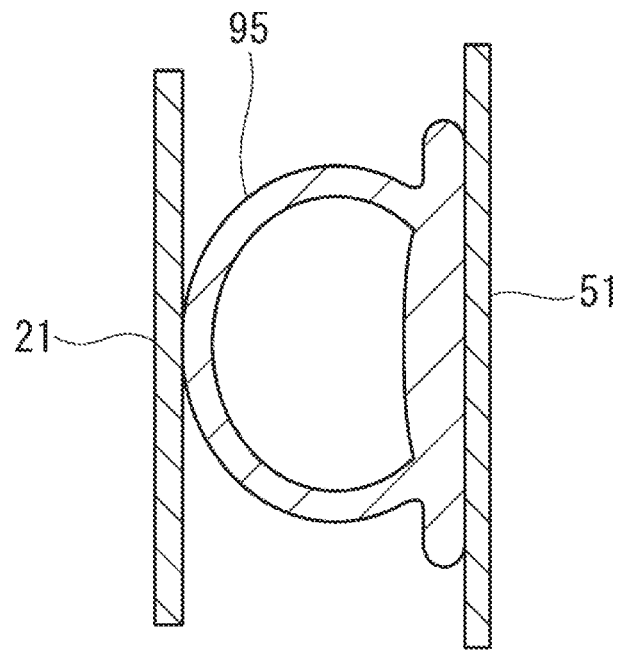
FIG. 10B is a cross-sectional view illustrating a fire seal of an elastic body as a conventional example.

In an example illustrated in FIG. 10B, the gap between the pylon member 21 and the nacelle member 51 is sealed by a rubber seal 95.

The rubber seal 95 is elastically deformed by a deformation amount corresponding to a dimension between the pylon member 21 and the nacelle member 51. The rubber seal 95 is in close contact with a surface of the pylon member 21 and a surface of the nacelle member 51 to block the gap between the pylon member 21 and the nacelle member 51. When the rubber seal 95 is exposed to flame, however, the rubber seal 95 may be disadvantageously melted or burned out to allow passage of the flame.

Unlike the rubber seal 95, the spring wall 11 and the channel member 12 of the fire seal structure 10 both contain the refractory material, and are present between the pylon member 21 and the nacelle member 51 for the necessary fire resistance time under the situation where the spring wall 11 and the channel member 12 are exposed to the flame. Spreading of the flame is inhibited by the spring wall 11 and the channel member 12, which makes it possible to prevent the flame occurring inside the fire-prevention region 6 from coming out of the fire-prevention region 6 for the fire resistance time.

According to the fire seal structure 10 of one or more embodiments, the spring wall 11 and the channel member 12 themselves withstand the flame for a long time as compared with the elastic seal made of the rubber material, and the fire seal performance is sufficiently secured as long as the spring wall 11 and the channel member 12 are present. This makes it possible to improve the fire seal performance without adding a member that shields the spring wall 11 and the channel member 12 from the flame. Therefore, it is also possible to contribute to reduction of the weight of the aircraft.

At this time, it is also considered that a metal elastic seal that is made of a metal material and has fire resistance equivalent to the fire resistance of each of the spring wall 11 and the channel member 12 is used. The metal elastic seal, however, is unsuitable for fire seal between the members that are relatively largely moved because it is difficult for the metal elastic seal to obtain a large elastic deformation amount. In addition, it is difficult that pressure is sufficiently applied to the metal elastic seal between the pylon member 21 and the nacelle member 51 to stably obtain repulsive force necessary for close contact even under the situation where the metal elastic seal is exposed to flame.

In the case where the elastic seal such as the rubber seal 95 (FIG. 10B) and the metal elastic seal is used to prevent passage of flame, sufficient verification for a shape and repulsive force of the elastic seal in elastic deformation, the adhesion of the elastic seal with the surface of the pylon member 21 and the surface of the nacelle member 51, etc. is desired on the assumption of the situation where the elastic seal is exposed to flame.

In contrast, in the fire seal structure 10, the plurality of walls 121, 11, and 122 are disposed so as to form the labyrinth gap 13 between the pylon member 21 and the nacelle member 51 to prevent passage of flame. Therefore, a huge number of tests, etc. to verify that the gap between the pylon member 21 and the nacelle member 51 is surely covered are unnecessary. It is sufficient for the fire seal structure 10 to verify maintaining of the fire seal performance through a test in which the fire seal structure 10 is placed under the situation where the fire seal structure 10 is exposed to radiated flame for the predetermined fire resistance time. This makes it possible to provide the fire seal structure 10 having secured fire seal performance in a short development period.

Further, abrasion is small because the walls of the fire seal structure 10 are not in contact with the corresponding facing members except when the pylon main body 2A and the thrust reverser cowl 5C are relatively largely moved. In the case where the elastic seal that is constantly in contact with a surface of a facing member is used, the elastic seal is remarkably abraded through repeat of the relative displacement, which requires frequent replacement. In contrast, in the fire seal structure 10, the fire seal performance is not deteriorated as long as the state where the walls 121, 11, and 122 are overlapped with one another is maintained even if abrasion occurs. Therefore, the fire seal structure 10 has a long life time. This makes it possible to reduce burden of inspection, replacement, etc. necessary for maintaining the fire seal performance. The fire seal structure 10 may make it possible to achieve maintenance free for a period corresponding to a life cycle of the aircraft.

According to one or more embodiments, if a sealant material having fire resistance is filled between the pylon member 21 and the nacelle member 51 in order to block the gap between the pylon member 21 and the nacelle member 51 to prevent passage of flame, the pylon member 21 and the nacelle member 51 are fixed by the solidified sealant, which is not matched to the thrust reverser cowl 5C that requires separation of the pylon member 21 and the nacelle member 51 for opening the thrust reverser cowl 5C. It is originally difficult to cause the sealant to follow the members 21 and 51 that are relatively displaced, to maintain the state where the gap between the members 21 and 51 is blocked.

In the fire seal structure 10, the spring wall 11 provided on the pylon member 21 and the channel member 12 provided on the nacelle member 51 are disposed such that the labyrinth gap 13 is formed between the pylon member 21 and the nacelle member 51 without blocking the gap between the pylon member 21 and the nacelle member 51. The spring wall 11 and the channel member 12 are separable from each other, which allows the thrust reverser cowl 5C supported to the pylon main body 2A to open with the hinge part 7 as a center.

The clearances C1 and C2, the dimension W of the overlapping, and a distance between adjacent walls out of the flange wall 121, the spring wall 11, and the flange wall 122, etc. may be appropriately determined in order to prevent interference between the members, based on the relative displacement amount of the pylon main body 2A and the thrust reverser cowl 5C, a trajectory of the channel member 12 with respect to the spring wall 11 when the thrust reverser cowl 5C pivots, extension of the member due to heat of the fire-prevention region 6 including therein the engine core 4 under operation, and the like.

Modifications of the fire seal structure according to one or more embodiments of the present invention are described below.

Figure 6A:
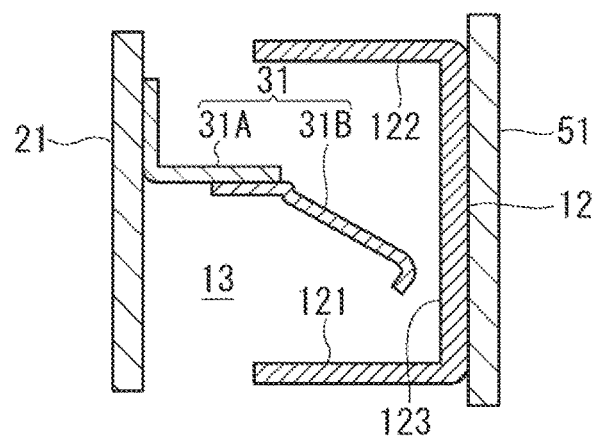
FIG. 6A is a cross-sectional view illustrating a modification of the spring wall according to one or more embodiments.

As illustrated in FIG. 6A, a spring wall 31 functioning as a spring, out of the plurality of walls 121, 31, and 122 forming the labyrinth gap 13, includes a partial wall 31A and a plate spring 31B. The partial wall 31A is fastened to the pylon member 21, and the plate spring 31B is provided at a front end part of the partial wall 31A.

In the stationary state illustrated in FIG. 6A, the plate spring 31B is not in contact with a facing web 123, and the spring wall 31 is closest to a corresponding facing part, among the walls 121, 31, and 122.

When the pylon member 21 and the nacelle member 51 are relatively largely moved, the plate spring 31B of the spring wall 31 comes into contact with the web 123 and is accordingly elastically deformed. At this time, the flange walls 121 and 122 are not brought into contact with the pylon member 21.

As illustrated in FIG. 6A, the fire seal structure that includes the spring wall 31 that partially includes the plate spring 31B also makes it possible to avoid interference between the members when the relative movement is large. In addition, the walls 121, 31, and 122 are disposed so as to be overlapped with one another to face flame, which makes it possible to prevent passage of the flame.

The fire seal structure according to one or more embodiments of the present invention may be configured in various forms as described below.

Configurations respectively illustrated in FIGS. 6B and 6C and FIGS. 7A to 7C described below each include a plurality of walls forming the labyrinth gap 13 in common, and at least a part of the walls is a spring wall functioning as a spring.

Figure 6B:
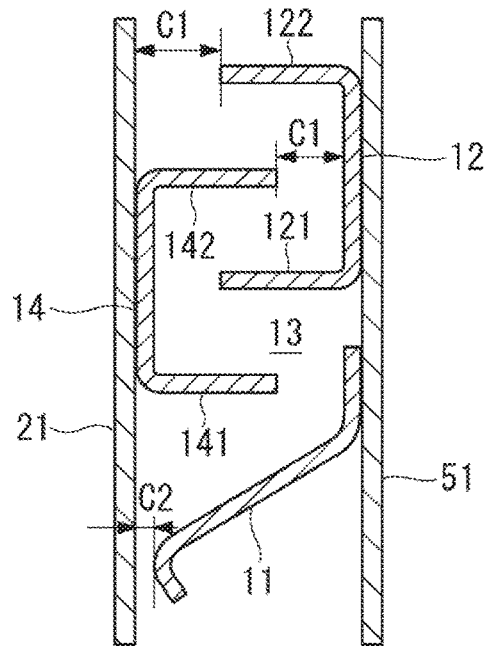
FIGS. 6B and 6C are cross-sectional views each illustrating a modification of the fire seal structure including combinations of various members.

A fire seal structure illustrated in FIG. 6B includes the spring wall 11 and two channel members 12 and 14.

The spring wall 11 is located outside the channel member 12 and the channel member 14, and is provided on the nacelle member 51 so as to face the pylon member 21.

The channel member 12 and the channel member 14 are oppositely disposed such that flanges of the channel member 12 and flanges of the channel member 14 engage with one another, and the spring wall 11, the flange walls 121 and 122, and flange walls 141 and 142 form the labyrinth gap 13. The channel member 12 is provided on the nacelle member 51, and the channel member 14 is provided on the pylon member 21.

Also in the configuration illustrated in FIG. 6B, the spring wall 11 is closest to the corresponding facing part, among all of the walls 11, 141, 121, 142, and 122, as with the above-described embodiments (FIG. 5).

Figure 6C:
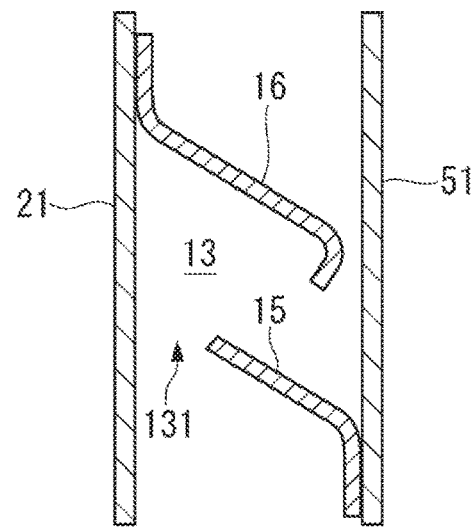

As illustrated in FIG. 6C, it is sufficient for the fire seal structure according to one or more embodiments of the present invention to include at least two walls, a wall 15 forming the inlet 131 of the labyrinth gap 13 and a wall 16 on which flame entering from the inlet 131 abuts. It is sufficient that at least one of the walls 15 and 16 is partially or entirely configured as a plate spring and functions as a spring.

Even if a number of walls disposed between the pylon member 21 and the nacelle member 51 is reduced, appropriately setting the dimensions of the respective clearances C1 and C2, the overlapping dimension W of the walls, the dimension of the distance between the adjacent walls, etc.

makes it possible to sufficiently prevent passage of the flame while achieving weight reduction.

Figure 7A:
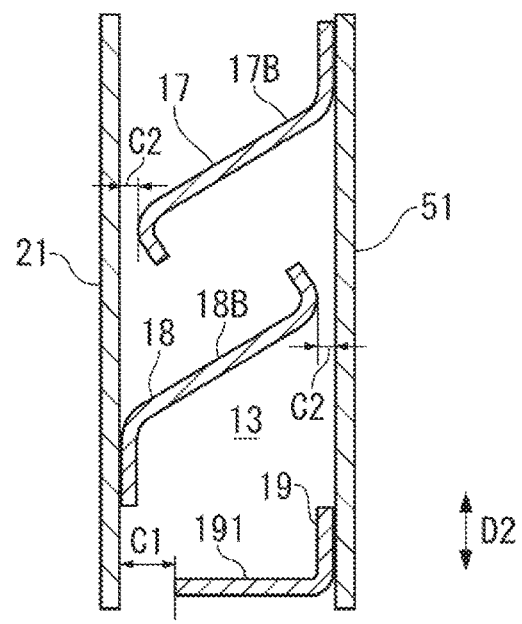
FIGS. 7A to 7C are cross-sectional views each illustrating a modification of a fire seal structure including a plurality of spring walls according to one or more embodiments.

A fire seal structure illustrated in FIG. 7A includes two spring walls 17 and 18 and one angle member 19 having an L-shaped cross-section.

The spring walls 17 and 18 are adjacent to each other, one spring wall 17 is disposed on the nacelle member 51 and the other spring wall 18 is disposed on the pylon member 21. A middle part 17B of the spring wall 17 and a middle part 18B of the spring wall 18 extend in parallel to each other.

The angle member 19 is disposed on the nacelle member 51 so as to form, together with the spring walls 17 and 18, the labyrinth gap 13. A wall 191 of the angle member 19 stands on the nacelle member 51.

The spring walls 17 and 18 as a part of the plurality of walls 191, 18, and 17 forming the labyrinth gap 13 are closest to the corresponding facing parts, among all of the walls 191, 18, and 17.

Figure 7B:
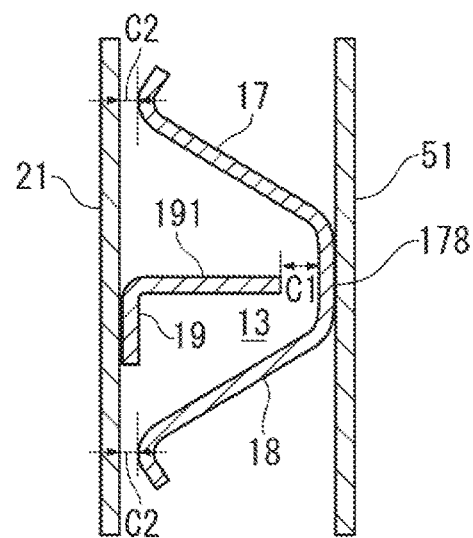

A fire seal structure illustrated in FIG. 7B includes two spring walls 17 and 18 that are disposed symmetrically in the vertical direction, and one angle member 19. The spring walls 17 and 18 are integrally formed.

Both of the spring walls 17 and 18 stand from a coupling part 178 provided on the nacelle member 51, toward the pylon member 21.

The angle member 19 is provided on the pylon member 21, and the wall 191 of the angle member 19 is located between the spring walls 17 and 18.

Also in the example illustrated in FIG. 7B, the spring walls 17 and 18 are closest to the corresponding facing parts, among all of the walls 18, 191, and 17.

Figure 7C:
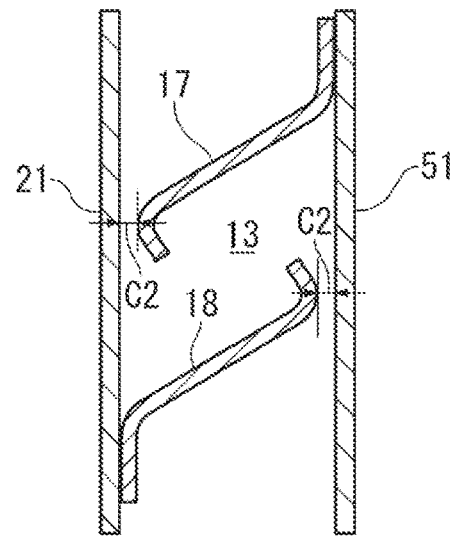

FIG. 7C illustrates an example in which a plurality of walls forming the labyrinth gap 13 are the spring walls 17 and 18. A wall other than the spring walls 17 and 18 is not provided between the pylon member 21 and the nacelle member 51.

According to the plurality of spring walls 17 and 18 illustrated in FIGS. 7A to 7C, the small clearance C2 is provided at a front end of each of the spring walls 17 and 18. Therefore, pressure loss is increased. As a result, even if pressure difference occurs between the fire-prevention region 6 and the outside, it is possible to suppress flowing out of flammable gas occurring inside the fire-prevention region 6.

It is unnecessary that the clearance C2 at the front end part of the spring wall 17 and the clearance C2 at the front end part of the spring wall 18 are exactly equal to each other. As illustrated in FIGS. 7A and 7B, in the case where the other wall 191 is provided, any of the clearances C2 at the respective front end parts of the spring walls 17 and 18 is smaller than the clearance C1 of the other wall 191.

In the embodiments and the modifications described above, the walls forming the labyrinth gap 13 are provided on the pylon member 21 and the nacelle member 51. These walls, however, may be integrally formed with the pylon member 21 and the nacelle member 51, or other members configuring the pylon 2 and other members configuring the thrust reverser cowl 5C, in terms of weight reduction.

The fact that the wall included in the fire seal structure according to one or more embodiments of the present invention is "provided on" the member (pylon main body 2A or thrust reverser cowl 5C) defining the fire-prevention region 6 encompasses integral formation of the wall with the partitioning member, in addition to the fact that the wall is disposed on the partitioning member by a fastening member or the like.

For example, when the flange walls 121 and 122 illustrated in FIG. 3 are integrally formed with the nacelle member 51 so as to stand on the nacelle member 51, necessity of the fastening members is eliminated, which allows for weight reduction.

Figure 8:
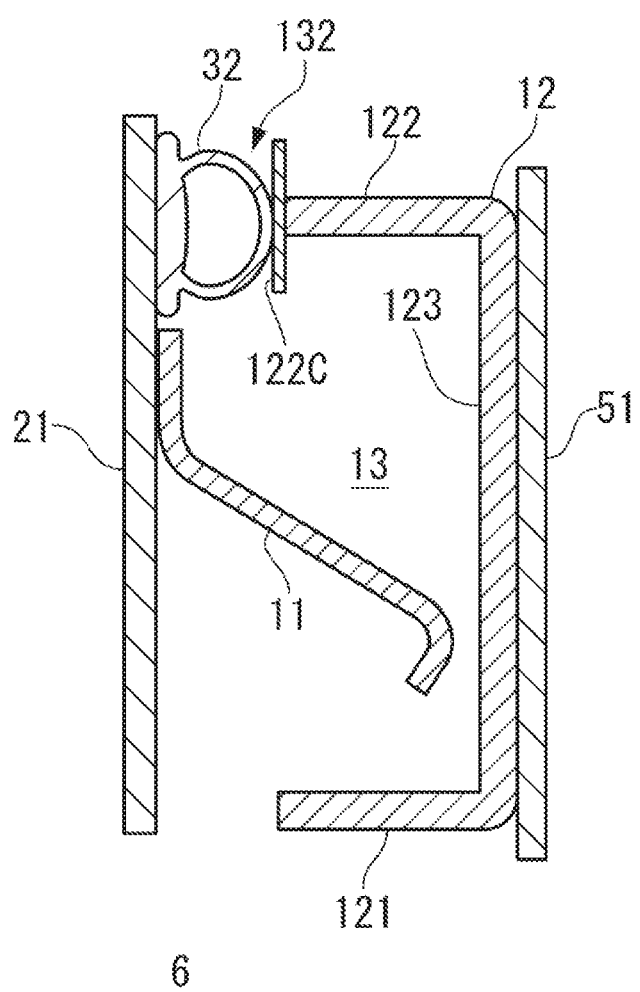
FIG. 8 is a cross-sectional view illustrating a fire seal structure that includes a seal member sealing one end of a labyrinth-like gap according to one or more embodiments.

The labyrinth gap 13 in the fire seal structure according to one or more embodiments of the present invention may be sealed by a seal member 32 as necessary as illustrated in FIG. 8. This makes it possible to prevent the flammable gas inside the fire-prevention region 6 from coming out of the fire-prevention region 6 through the labyrinth gap 13.

The seal member 32 illustrated in FIG. 8 is compressed and elastically deformed at an outlet 132 of the labyrinth gap 13, namely, between the pylon member 21 and a front end part 122C located at a front end of the flange wall 122. As a result, the gap between the front end part 122C and the pylon member 21 is blocked. The seal member 32 is provided on the pylon member 21 in FIG. 8; however, the seal member 32 may be provided on the front end part 122C.

The seal member 32 is a rubber seal having elastic modulus sufficiently smaller than elastic modulus of the spring wall 11. Therefore, the spring wall 11 is elastically deformed without any trouble when brought into contact with the web 123.

Disposing the seal member 32 at the labyrinth gap 13 eliminates necessity of other fire prevention measures to an adjacent region to which the flammable gas may be leaked through the labyrinth gap 13. Accordingly, constraint that a combustible accessory that may become an ignition source is not installable in the adjacent region is eliminated, and large flexibility in device installation is provided.

Since the seal member 32 is not directly exposed to flame, the seal member 32 may be formed with use of an appropriate material or a typical rubber material in some cases. Therefore, even if seal replacement is necessary due to abrasion, the cost of the seal itself is suppressed and economical. The seal member 32 is not limited to a hollow valve-shaped rubber seal as illustrated in FIG. 8, and a plate spring-like rubber seal may be used as the seal member 32.

A thickness withstanding flame and repulsive force closely sealing the labyrinth outlet 132 are unnecessary for the seal member 32. Therefore, the seal member 32 that has the thickness and the length sufficient to block the gap between the front end of the flange wall 122 and the pylon member 21 is used.

Note that, in place of the seal member 32, a member that applies large resistance to air flow, such as a brush, may be used.

Other than the above, the configurations described in the above-described embodiments may be selected or appropriately modified without departing from the scope of the present invention.

Figure 9A:
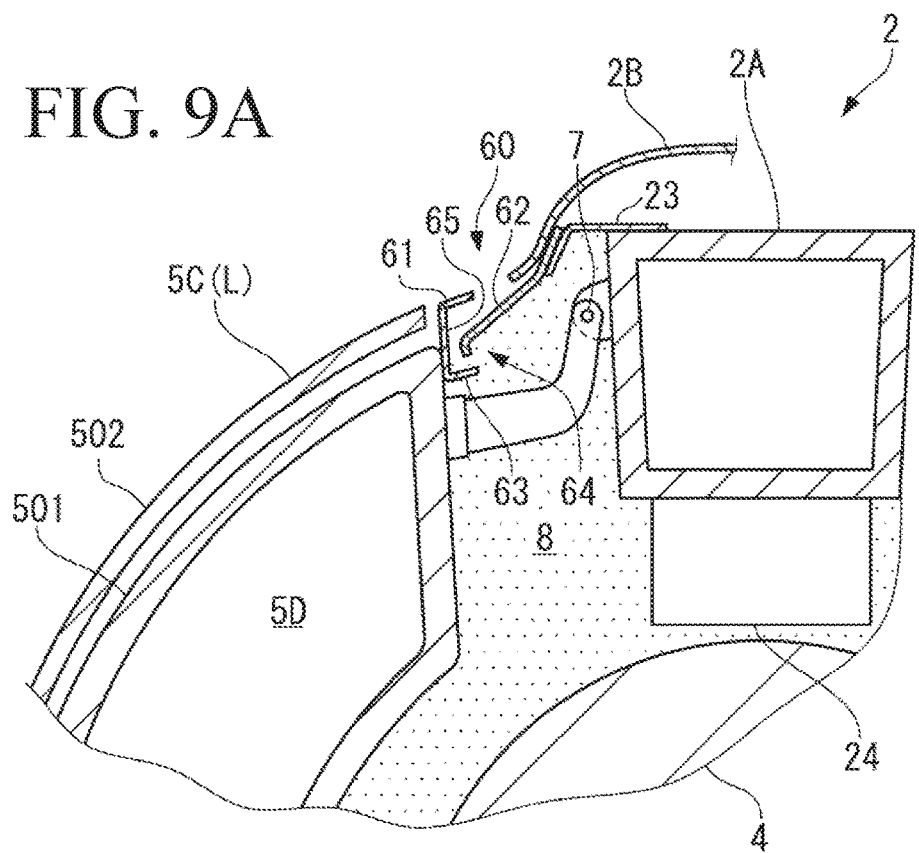
FIGS. 9A and 9B are cross-sectional views each illustrating a modification of one or more embodiments of the present invention.

FIG. 9A illustrates a fire seal structure 60 that prevents passage of flame through a connection portion between the pylon fairing 2B and the thrust reverser cowl 5C. The pylon fairing 2B defines a fire-prevention region 8 provided around the engine. The fire seal structure 60 includes a plurality of walls 61 to 63 positioned between the pylon fairing 2B and the cowl portion 501, and the wall 62 is configured as a spring wall functioning as a spring. The spring wall 62 is provided on the pylon fairing 2B while supported to a fitting 23 provided on the pylon main body 2A. Note that, in an example illustrated in FIG. 9B, the fitting 23 supports the pylon fairing 2B. In the example illustrated in FIG. 9B, the spring wall 62 may be integrally formed with the pylon fairing 2B. Alternatively, the spring wall 62 may be attached to the fitting 23 or the pylon fairing 2B by a fastener or the like.

In the stationary state where the pylon fairing 2B and the thrust reverser cowl 5C are not relatively moved, the spring wall 62 is closest to a corresponding facing part (web 65 of channel member), among the walls 61 to 63 forming a labyrinth-like gap 64.

In this case, a member facing a front end part of the wall 63 is not present within at least a range where interference is concerned around the front end part of the wall 63. The spring wall 62 is similar to the spring wall 11 and the like in the embodiments and the modifications described above, in that the spring wall 62 is closest to the corresponding facing member in the stationary state among the walls 61 and 62, a front end of each of which faces a corresponding member, and the wall 63. If a member facing the front end part of the wall 61 is not present around the front end part of the wall 61, the spring wall 62 is still closest to the corresponding facing member in the stationary state among the walls 61 to 63

Figure 9B:
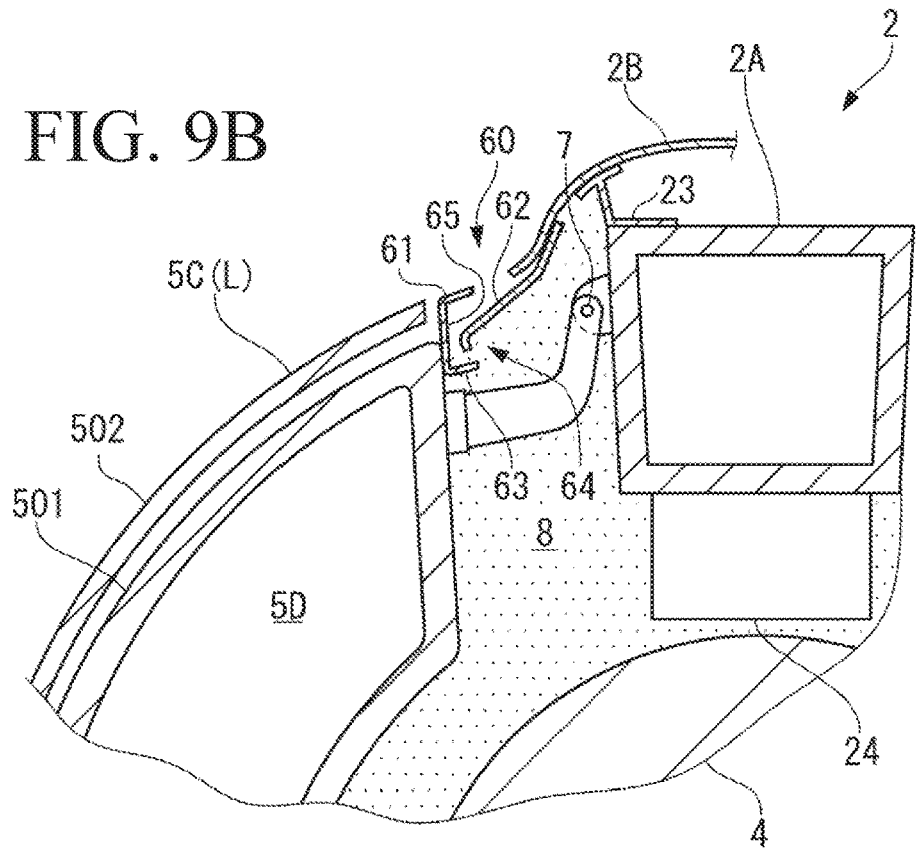

In any of the configurations illustrated in FIGS. 9A and 9B, the spring wall 62 comes into contact with the corresponding facing part and is accordingly elastically deformed when the pylon fairing 2B and the thrust reverser cowl 5C are relatively largely moved in the approaching direction.

The walls 61 to 63 are disposed so as to be overlapped with one another and to face flame, which makes it possible to prevent the flame from coming through from the inside to the outside of the fire-prevention region 8.

In the case where the fire seal structure 60 is disposed on an outer surface of the aircraft as illustrated in FIGS. 9A and 9B, leakage of the flammable gas is allowed in regulations in some cases on the assumption that an ignition source is not present outside the aircraft. In this case, the seal member 32 as illustrated in FIG. 8 becomes unnecessary unlike the case where the seal member 32 is required in order to suppress flowing out of the flammable gas in the above-described fire seal structure 10 (FIG. 2). This makes it possible to improve maintainability such as cost reduction, weight reduction, reduction of seal replacement frequency due to rubber seal abrasion by elimination of the seal member 32.

Further, applying the seal member 32 as illustrated in FIG. 8 to the configurations of FIGS. 9A and 9B makes it possible to surely prevent the flammable gas from being released to the atmosphere. Accordingly, it is possible to easily respond to revision of regulations.

The fire seal structure according to one or more embodiments of the present invention is applicable to other fire-prevention regions of the aircraft without limitation to the fire-prevention region provided around the engine.

For example, the fire seal structure according to one or more embodiments of the present invention is applicable to a connection portion between members defining an unillustrated fire-prevention region that is provided around an auxiliary power unit (APU) of the aircraft.

Although the disclosure has been described with respect to only a limited number of embodiments, those skilled in the art, having benefit of this disclosure, will appreciate that various other embodiments may be devised without departing from the scope of the present invention. Accordingly, the scope of the invention should be limited only by the attached claims.

DESCRIPTION OF SYMBOLS

1 Engine
2 Pylon
2A Pylon main body (first partitioning member)
3 Fan
4 Engine core
5 Engine nacelle
5A Air inlet
5B Fan cowl
5C Thrust reverser cowl (second partitioning member)
5D Flow path
6, 8 Fire-prevention region
7 Hinge part
10 Fire seal structure
11 Spring wall
11' Plate spring stacked body
11A Fastened part
11B Middle part
11C Front end part
12, 14 Channel member
13 Labyrinth gap (labyrinth-like gap)
15, 16 Wall
17, 18 Spring wall
17B, 18B Middle part
19 Angle member
191 Wall
20 Member
21 Pylon member
22 Member
23 Fitting
24 Accessory
31 Spring wall
31A Partial wall
31B Plate spring
32 Seal member (blocking member)
51 Nacelle member
60 Fire seal structure
64 Labyrinth gap
62 Spring wall
61, 63 Wall
65 Web
90 Labyrinth gap
91, 92, 93 Wall
95 Rubber seal
110 Part
111, 112 Plate spring
121, 122 Flange wall
121C, 122C Front end part
123 Web
131 Inlet
132 Outlet
141, 142 Flange wall
501 Cowl portion
501A Inner part
501B Outer part
502 Reverse thrust operation portion
C1, C2 Clearance
C3 Clearance
D1 Width direction
D2 Vertical direction
F Flame
R, L Member
S Gap
S1, S2 Slit
W Overlapping dimension
X Distance
XO Dimension

What is claimed is:
1. A fire seal structure that prevents flame from coming out of a fire-prevention region of an aircraft including a first partitioning member and a second partitioning member, the fire seal structure comprising:
- a plurality of walls including:
  - a first wall provided on the first partitioning member; and
  - a second wall provided on the second partitioning member,
- wherein one of the plurality of walls is a spring wall that functions as a spring,
- wherein the first and the second partitioning members define the fire-prevention region,
- wherein the plurality of walls form a labyrinth-shaped gap between the first and the second partitioning members,
- wherein, each of the plurality of walls contains a refractory material and includes a front end part,
- wherein, when the first and the second partitioning members are stationary with respect to each other, the front end part is not in contact with another member, and the spring wall is disposed closest to a facing member, among the plurality of walls.

2. The fire seal structure for the aircraft according to claim 1, wherein, when the first and the second partitioning members move closer to each other, the spring wall comes into contact with the facing member and is elastically deformed whereas the other walls do not come into contact with the facing member.

3. The fire seal structure for the aircraft according to claim 1,
- wherein the spring wall is a stacked body in which two or more comb tooth-shaped plate springs each including a plurality of slits are stacked, and
- wherein the slits of one of the two or more plate springs are each covered by a corresponding portion between the slits of the other plate spring.

4. The fire seal structure for the aircraft according to claim 1, wherein two or more of the plurality of walls are each configured as the spring wall.

5. The fire seal structure for the aircraft according to claim 1,
- wherein the first partitioning member is a pylon supporting an engine of the aircraft, and
- wherein the second partitioning member is a nacelle surrounding a main body of the engine.

6. The fire seal structure for the aircraft according to claim 1, wherein the labyrinth-shaped gap is blocked by a blocking member that is provided on one of the wall and the facing member.

7. An aircraft comprising the fire seal structure according to claim 1.

8. A fire seal structure that prevents flame from coming out of a fire-prevention region of an aircraft including a first partitioning member and a second partitioning member, the fire seal structure comprising:
- a plurality of walls including:
  - a first wall provided on the first partitioning member; and
  - a second wall provided on the second partitioning member,
- wherein the first and the second partitioning members define the fire-prevention region,
- wherein the plurality of walls forms a labyrinth-shaped gap between the first and the second partitioning members,
- wherein each of the plurality of walls is a spring wall that contains a refractory material and functions as a spring, and includes a front end part,
- wherein, when the first and the second partitioning members are stationary with respect to each other, the front end part is not in contact with a facing member, and
- wherein, when the first and the second partitioning members move closer to each other, the plurality of walls comes into contact with the facing member and is elastically deformed.

* * * * *